(12) United States Patent
Mack et al.

(10) Patent No.: US 8,488,651 B1
(45) Date of Patent: Jul. 16, 2013

(54) ENCODING SCHEME FOR DATA TRANSFER

(75) Inventors: Robert Mack, San Jose, CA (US);
Stephen O'Connor, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/204,522

(22) Filed: Aug. 5, 2011

Related U.S. Application Data (60) Division of application No. 13/053,185, filed on Mar. 21, 2011, which is a continuation of application No. 12/790,642, filed on May 28, 2010, now abandoned, which is a continuation of application No. 10/775,668, filed on Feb. 9, 2004, now Pat. No. 7,729,408.

(51) Int. Cl.
*H04B 1/00* (2006.01)

(52) U.S. Cl.
USPC .......................... 375/147; 375/140; 375/150

(58) Field of Classification Search
USPC .......... 375/147, 130, 140, 141, 150; 370/213, 370/318, 330, 335, 345; 342/15, 193
See application file for complete search history.

(56) References Cited

U.S. PATENT DOCUMENTS

| | | | | |
|---|---|---|---|---|
| 4,125,764 | A | * | 11/1978 | Chambers et al. ............ 714/745 |
| 5,105,437 | A | * | 4/1992 | Kingston et al. ............. 375/149 |
| 5,136,614 | A | | 8/1992 | Hiramatsu et al. |
| 5,216,693 | A | | 6/1993 | Nakamura |
| 5,553,042 | A | | 9/1996 | Usui |
| 6,009,087 | A | * | 12/1999 | Uchida et al. ................. 370/335 |
| 6,035,177 | A | | 3/2000 | Moses et al. |
| 6,061,342 | A | | 5/2000 | Tsubouchi et al. |
| 6,377,645 | B1 | | 4/2002 | Chen et al. |
| 6,487,238 | B1 | | 11/2002 | Kamo |
| 6,727,790 | B2 | | 4/2004 | Raphaeli et al. |
| 7,072,372 | B2 | | 7/2006 | Ohki et al. |
| 7,092,372 | B1 | | 8/2006 | Jensen et al. |
| 7,280,615 | B2 | | 10/2007 | Roberts |
| 7,463,709 | B2 | * | 12/2008 | Raphaeli et al. ............. 375/366 |
| 7,519,101 | B1 | * | 4/2009 | Wright .......................... 375/140 |
| 7,526,250 | B2 | | 4/2009 | Fullerton et al. |
| 2004/0120424 | A1 | | 6/2004 | Roberts |
| 2004/0141525 | A1 | | 7/2004 | Bhushan et al. |
| 2004/0258131 | A1 | | 12/2004 | Margon |
| 2006/0166681 | A1 | | 7/2006 | Lohbihler |

OTHER PUBLICATIONS

U.S. Appl. No. 11/006,934: "Method and Apparatus for Using Empty Time Slots for Spread Spectrum Encoding," David Wright, filed Dec. 7, 2004; 24 pages.
U.S. Appl. No. 12/403,929: "Method and Apparatus for Using Empty Time Slots for Spread Spectrum Encoding," David Wright, filed Mar. 13, 2009; 14 pages.
USPTO Final Rejection for U.S. Appl. No. 10/775,668 dated Nov. 21, 2007; 10 pages.
USPTO Non-Final Rejection for U.S. Appl. No. 10/775,668 dated Feb. 7, 2007; 13 pages.

(Continued)

*Primary Examiner* — Shuwang Liu
*Assistant Examiner* — Helene Tayong (57) ABSTRACT

A spread spectrum slip time encoding scheme encodes data values with one or more Pseudo Noise (PN) codes and generates a corresponding PN encoded data stream. Other data values are encoded into the PN encoded data stream by varying a slip time between the 10 encoded data values.

20 Claims, 9 Drawing Sheets

OTHER PUBLICATIONS

USPTO Non-Final Rejection for U.S. Appl. No. 10/775,668 dated Jun. 11, 2007; 16 pages.
USPTO Non-Final Rejection for U.S. Appl. No. 10/775,668 dated Jul. 25, 2008; 17 pages.
USPTO Non-Final Rejection for U.S. Appl. No. 10/775,668 dated Sep. 16, 2009; 10 pages.
USPTO Non-Final Rejection for U.S. Appl. No. 11/006,934 dated Apr. 16, 2008; 16 pages.
USPTO Non-Final Rejection for U.S. Appl. No. 11/006,934 dated Oct. 30, 2007; 10 pages.
USPTO Non-Final Rejection for U.S. Appl. No. 13/053,185 dated Apr. 12, 2012; 12 pages.
USPTO Notice of Allowance for U.S. Appl. No. 10/775,668 dated Feb. 7, 2008; 7 pages.
USPTO Notice of Allowance for U.S. Appl. No. 10/775,668 dated Mar. 22, 2010; 8 pages.
USPTO Notice of Allowance for U.S. Appl. No. 10/775,668 dated Mar. 31, 2009; 7 pages.
USPTO Notice of Allowance for U.S. Appl. No. 11/006,934 dated Nov. 28, 2008; 5 pages.
USPTO Requirement for Restriction for U.S. Appl. No. 10/775,668 dated Feb. 4, 2009; 5 pages.
USPTO Requirement for Restriction for U.S. Appl. No. 13/053,185 dated Feb. 29, 2012; 5 pages.
USPTO Requirement Restriction for U.S. Appl. No. 12/790,642, dated Sep. 28, 2010; 5 pages.

* cited by examiner

FIG.1
(BACKGROUND)

FIG.2 (BACKGROUND)

FIG.3
(BACKGROUND)

ENCODING SCHEME FOR DATA TRANSFER

RELATED APPLICATIONS

This application is a divisional of U.S. patent application Ser. No. 13/053,185 filed Mar. 21, 2011, abandoned as of Dec. 3, 2012, which is a continuation of U.S. patent application Ser. No. 12/790,642, filed May 28, 2010, and abandoned as of Jul. 20, 2011, which is a continuation of U.S. patent application Ser. No. 10/775,668, filed Feb. 9, 2004, now U.S. Pat. No. 7,729,408, issued Jun. 1, 2010, all of which are hereby incorporated by reference herein.

BACKGROUND

Direct Sequence Spread Spectrum (DSSS) encoding is a transmission technique in which a Pseudo Noise (PN) code is used as a modulation waveform to "spread" signal energy over a bandwidth much greater than the signal information bandwidth. At a receiver, the signal is "dispread" using a synchronized replica of the pseudo-noise code. The PN codes are a sequence of binary numbers called 'chips' having strong auto and cross correlation properties.

Frequency Hopping Spread Systems typically use 64 bit chip PN-codes to synchronize data streams. DSSS systems, such as the ones used with wireless Universal Serial Bus (USB) products, typically use 64 or 32 chip PN-Codes.

Figure 1:
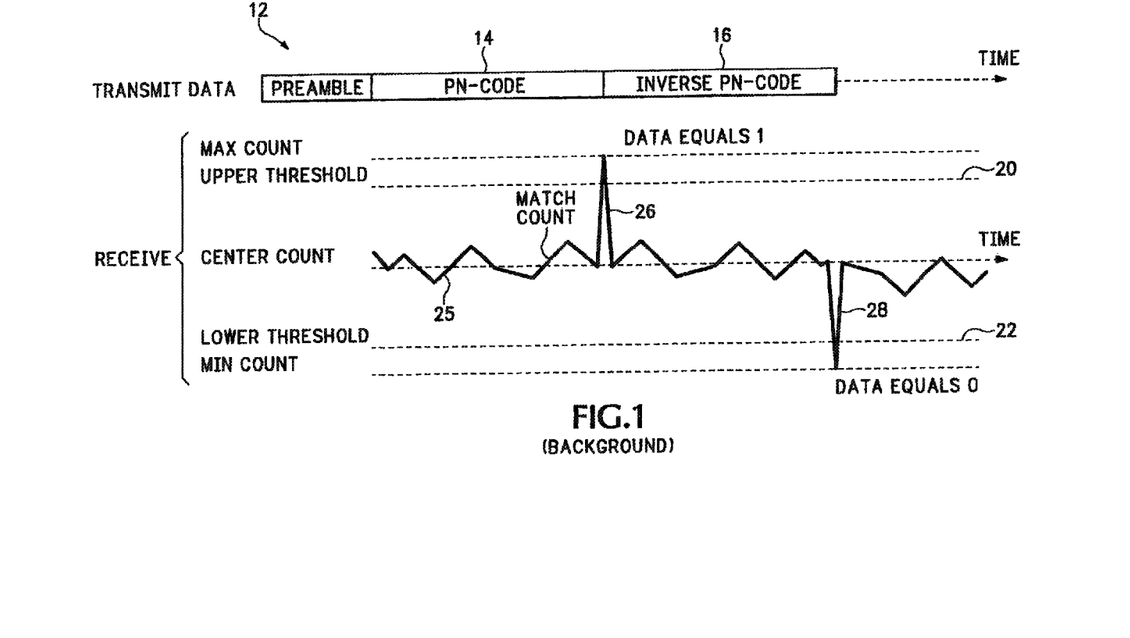
FIG. 1 is a diagram showing how data values are identified in an PN-encoded data stream.

Referring to FIG. 1, a receiver in a spread spectrum system correlates a received spread spectrum RF data stream 12 against known PN-Codes in order to extract data values. The receiver looks for PN-code matches and PN-code mismatches. A match for a sample of PN-Code 14 equals a value of '1' and a match of an inverse sample of the PN-Code 16 equals a value of '0'.

A counter in the receiver determines when there is a PN-code match or mismatch. The counter maintains a match count 25 for the number of chips in the reference PN-code that match samples of the encoded data stream 12. When the chip match count 26 reaches an upper threshold 20, the receiver generates a data value of '1'. When the chip match count 28 reaches a lower threshold 22, the receiver generates a data value of '0'. The spread spectrum correlator has a high correlation characteristic, meaning that a large abrupt spike 26 or 28 in the match count occurs when the receiver detects PN-Codes in the encoded data stream 12.

Figure 2:
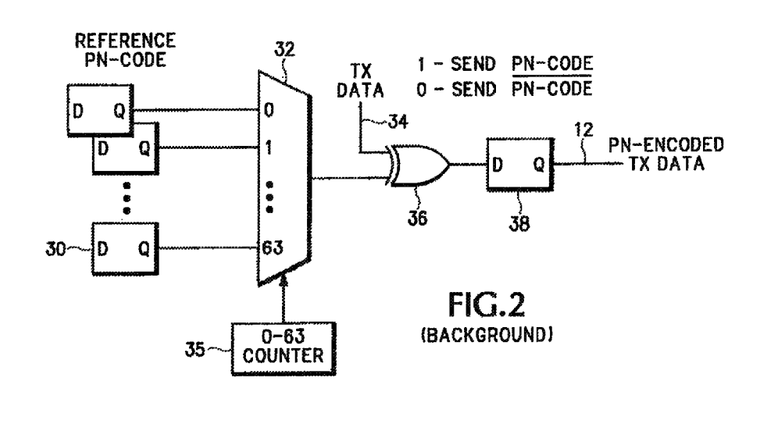
FIG. 2 is a circuit diagram of a spread spectrum encoder.

FIG. 2 shows one example of a Spread Spectrum (SS) transmitter in further detail. The SS transmitter includes multiple flip-flops 30 that store the chips for the PN-code. The PN-code stored in the flip-flops 30 is fed into a multiplexer (mux) 32. This example shows a 64 chip PN-code with the mux 32 having one input for each PN-code chip. A counter 35 is used for controlling when the PN-code chips are output from mux 32. The counter repeatedly counts up from 0 to 63 sequentially outputting 1 chip from each of the sixty-four flip-flops 30.

An exclusive-OR gate 36 encodes transmit data 34 with the PN-codes output from the mux 32. For a data bit value of '1' for example, the chips for the 64 bit PN-code are output unchanged from exclusive-OR gate 36. For a transmit data value of '0', the exclusive-OR gate 36 inverts each chip of the 64 bit PN-code. The output of exclusive-OR gate 36 is buffered by a flip-flop 38 and then output as the PN-encoded transmit data stream 12 previously shown in FIG. 1.

Figure 3:
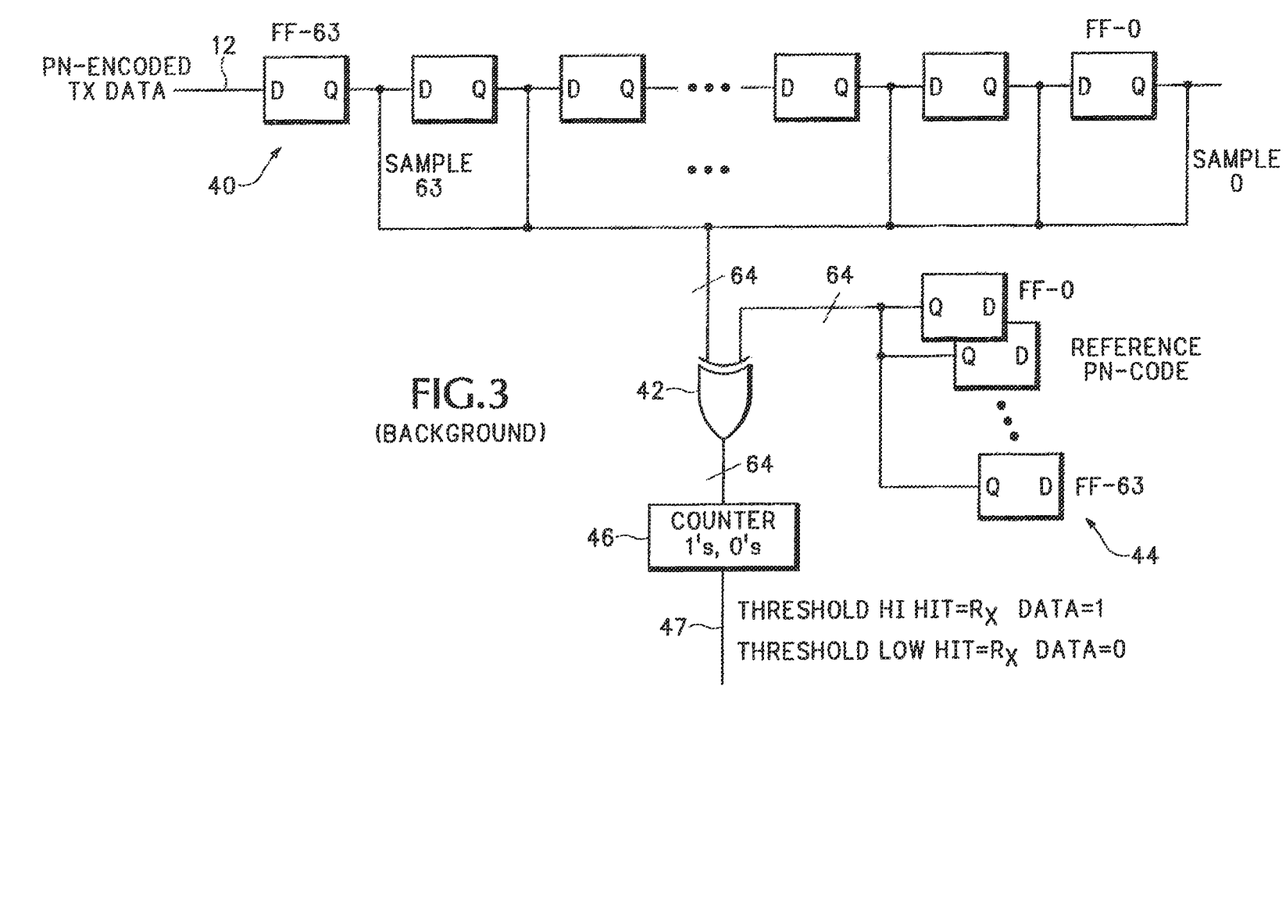
FIG. 3 is a circuit diagram of a spread spectrum correlator.

FIG. 3 shows in more detail one example of a spread spectrum correlator. Multiple flip-flops 40 are used to sample the PN-encoded transmit data stream 12. A sample clock (not shown) causes the flip-flops 40 to sequentially sample the received data stream 12. An exclusive-OR circuit 42 compares the data latched by flip-flops 40 with a reference PN-code stored in flip-flops 44. The exclusive-OR circuit 42 generates a logic '1' value for the chips in the reference PN-code that match samples of the PN-encoded data stream 12 latched by flip-flops 40. The exclusive-OR circuit 42 generates logic '0' values for the reference PN-code chips that do not match the samples latched in flip-flops 40.

For each clock period, another sample of the PN-encoded data stream 12 is latched into the flip-flops 40. For each clock period, a parallel 64-bit counter 46 counts the number of logic 1's and logic 0's output by the exclusive-OR circuit 42. When the number of logic 1 values reach the upper threshold 20 shown in FIG. 1, the counter 46 generates a data value of 1 from output 47. When the number of logic 0 values reaches the lower threshold 22 shown in FIG. 1, the counter 46 generates a data value of 0 on output 47.

Spread spectrum systems as described above have improved noise interference robustness and processing gain that allows longer range and better quality of service. However, these spread spectrum systems provide these improvements at the cost of a substantial reduction in bandwidth. For example, 64 chips have to be generated and processed to transmit one data bit of information. Thus, for a system with a 1 million chips per second (mcps) bandwidth and a code length of 64 chips, the effective data rate is 16 thousand bits per second (kbps).

One way to increase the spread spectrum data rate is to increase the number of PN-codes used to encode the data stream. However, each additional PN-code used to encode the data exponentially increases the complexity of the hardware. Further, the correlation described all bits of all PN codes need to be compared before a match count can be made. So the added logic for handling multiple PN codes is particularly complex for the receive process.

SUMMARY OF THE INVENTION

A spread spectrum slip time encoding scheme encodes data values with one or more Pseudo Noise (PN) codes and generates a corresponding PN encoded data stream. Other data values are encoded into the PN encoded data stream by varying a slip time between the PN encoded data values.

The foregoing and other objects, features and advantages of the invention will become more readily apparent from the following detailed description of a preferred embodiment of the invention which proceeds with reference to the accompanying drawings.

DETAILED DESCRIPTION

The invention takes advantage of the strong correlation properties of spread spectrum schemes that allow precise detection of PN-codes. These strong correlation characteristics are used to encode additional data values into a spread spectrum data stream by varying the spacing between adjacent PN-codes. The invention can be incorporated into existing spread spectrum encoders and correlators with minimal hardware or software additions and modifications.

Figure 4:
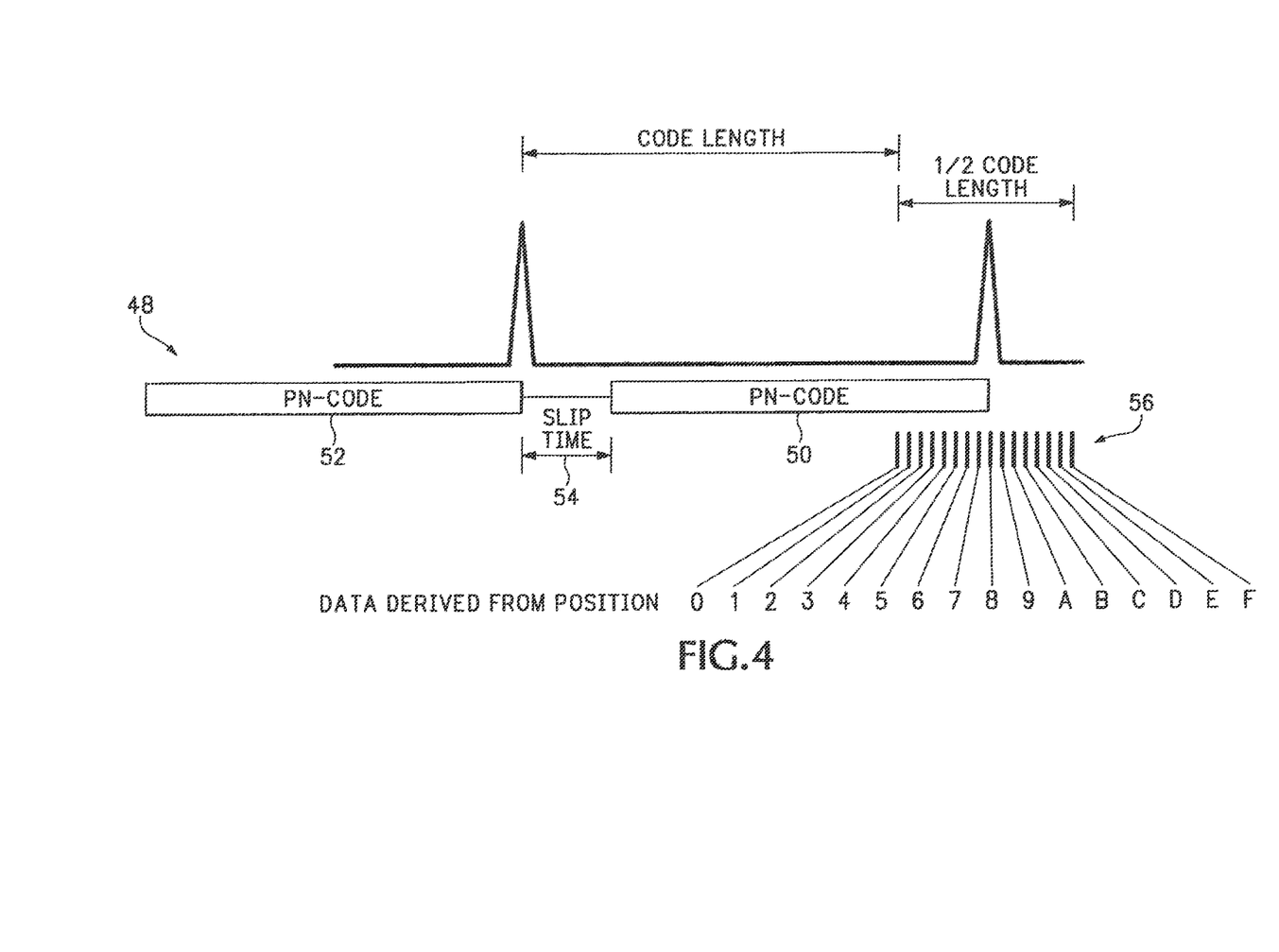
FIG. 4 is a diagram showing a Spread Spectrum Slip Time (S SST) encoding scheme.

FIG. 4 shows a PN-encoded bit stream 48 that includes a first PN-code 50 followed sequentially by a second PN-code 52. A slip time 54 is encoded into the bit stream 48 between the two adjacent PN-codes 50 and 52. The length (number of time units) in the slip time 54 corresponds with a data value. For example, a slip time 54 of zero time units may correspond to a data value of zero. A slip time 54 of fifteen time units may correspond to a data value of fifteen. In one example, each slip time unit 56 represents one four bit data value. The slip time encoding as shown in FIG. 4 allows five bits of data to be sent in the PN-encoded bit stream 48 in the time typically used for sending 1.5 bits or less of data.

Figure 5:
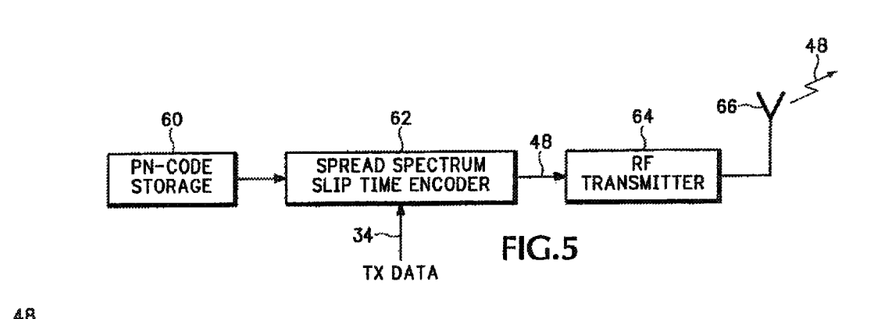
FIG. 5 is a block diagram showing an SSST transmitter.

FIG. 5 shows the primary functional blocks of a transmitter that provides spread spectrum slip time encoding. A PN-storage device 60 could include the flip-flops 30 previously shown in FIG. 2. However, any memory device could be used to store the one or more PN-codes used for encoding data. The PN-codes contained in storage device 60 and the transmit data 34 are provided to a Spread Spectrum Slip Time (SSST) encoder 62. The encoded bit stream 48 previously shown in FIG. 4 is output from the SSST encoder 62 to conventional Radio Frequency (RF) transmitter circuitry 64 that wirelessly outputs the slip time/spread spectrum encoded data stream 48 from an antenna 66 to a SSST receiver shown in FIG. 6.

Figure 6:
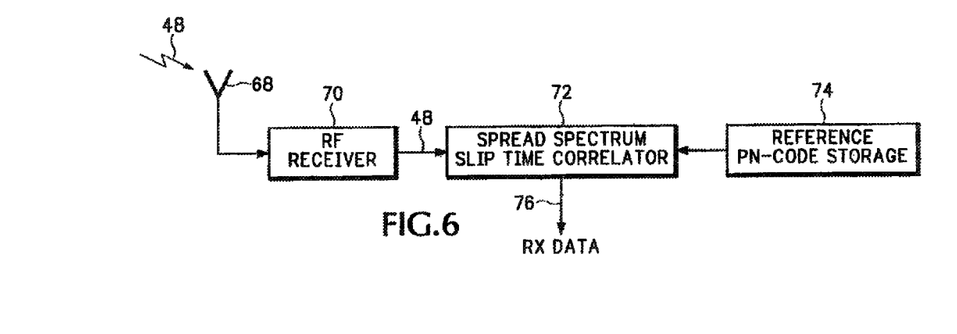
FIG. 6 is a block diagram showing an SSST receiver.

The SSST receiver in FIG. 6 includes a conventional antenna 68 and analog RF receiver circuitry that receives the encoded bit stream 48. An SSST correlator 72 receives the encoded bit stream 48 from RF receiver 70 and receives reference PN-codes from a storage device 74. The storage device 74 can also be any type of memory device, but the correlation described below compares all bits of all PN codes before a match count can be made. So it would be preferable to use a memory device that outputs all the bits of the PN code at the same time. The SSST correlator 72 decodes data 76 from both the transmitted PN-codes and from the detected slip times in the encoded data stream 48.

Figure 7:
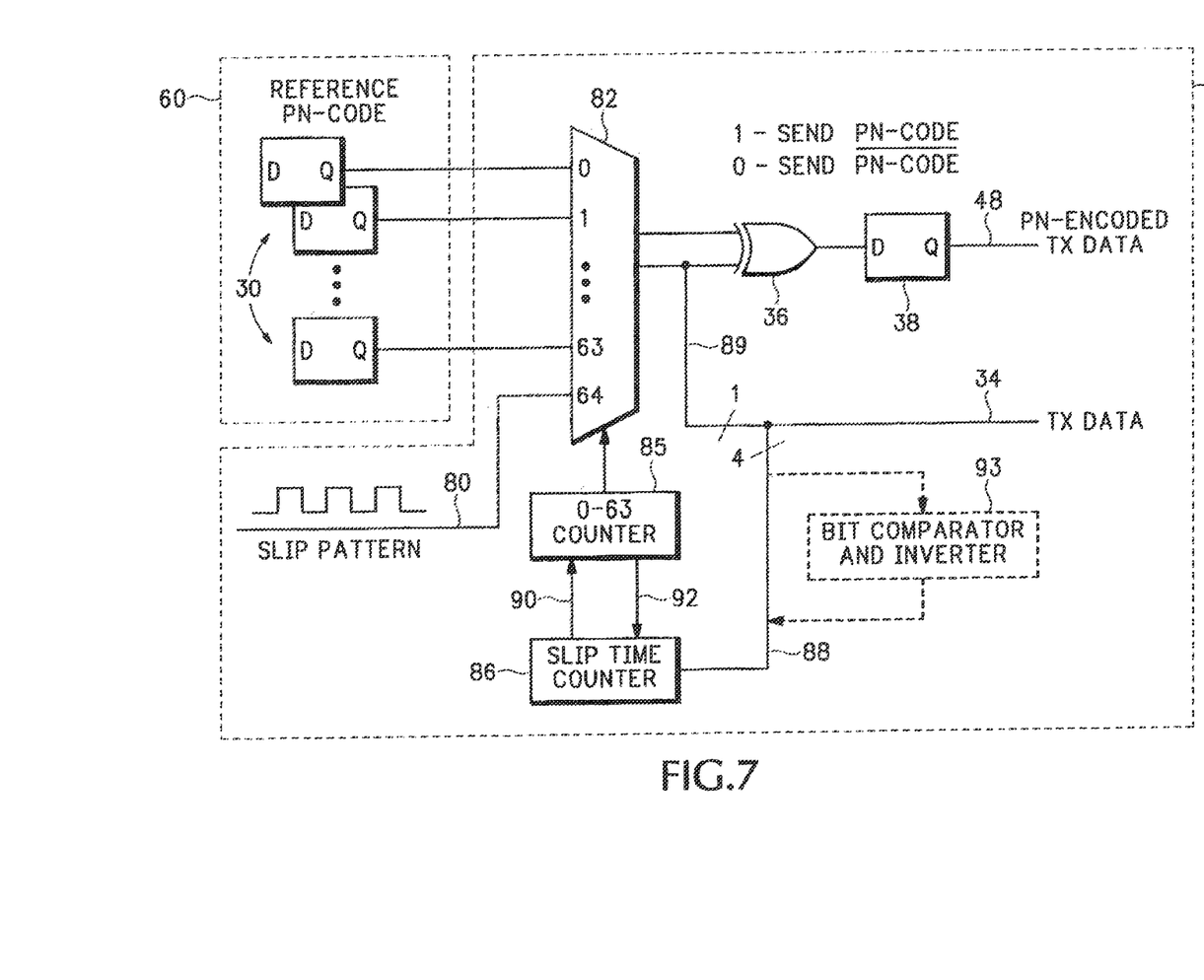
FIG. 7 is a circuit diagram showing an SSST encoder.

FIG. 7 shows in more detail some of the circuitry contained in the SSST transmitter shown in FIG. 5. The PN-code storage device 60 includes the same flip-flops 30 previously shown in FIG. 2. The flip-flops 30 output chips for the PN-code to mux 82. The example in FIG. 7 shows storage of only one 64 bit PN-code. However, multiple PN-codes could be used. For example, to provide a second PN-code, a second set of flip-flops would be coupled, to a second set of inputs in the mux 82. Alternatively, a second mux is used for the second set of flip-flops that hold the second PN-code. A controller (not shown) would then control the one or more muxes switching back and fourth in selecting either the first set of flip-flops 30 or the second set of flip-flops for outputting to the exclusive-OR circuit 36. The PN-codes used with the SSST encoder 62 can use more than 64-chips or less then 64-chips.

In one example, the granularity of each slip unit 56 (FIG. 4) is one chip. Thus, an eight chip delay between two adjacent PN-codes corresponds to a decimal value of 8 and the binary value "1000". However, a higher or lower granularity could also be used. For example, to increase noise tolerance, each slip unit 56 may have a granularity of two chips.

A counter 85, in one aspect, operates in a manner similar to the counter 34 in FIG. 2. The counter 85 counts from 0 to 63 then repeats starting from 0 again and counting back up to 63. The transmit data value 34 on data line 89 is combined by exclusive-OR circuit 36 with the chips output by mux 82. Thus, the first PN-code chip received from the 0 input of mux 82 is exclusively-ORed with the data value from data line 89 for the first 0 count value output by counter 85. On the second 1 count value output by counter 85, the second PN-code chip from mux input 1 is exclusively-ORed with the same transmit data value on data line 89.

The counter 85 continues to count by one until it reaches a count value of 63. The counter 85 then either resets back to 0, or possibly increments to a count value of 64, depending on the next data value on data lines 88. A start slip count signal 92 is activated when the counter 85 reaches the end of the 64 count period. For example, when the counter 85 reaches the count value of 63, the slip count signal 92 is activated by counter 85. Before starting a new count from count value 0, the counter 85 waits for a repeat count signal 90 from a slip time counter 86. If the repeat count signal 90 is not activated when the counter 85 reaches count 63, the counter 85 increases the count value to 64 and then waits for activation of the repeat count signal 90. If the repeat count signal 90 is activated when the counter 85 reaches count 63, the counter 85 automatically resets the count value to 0 and starts counting back up again to 63.

The slip time counter 86 detects activation of signal 92 and starts a count that corresponds to the value on data lines 88. The example shown in FIG. 7 shows a four bit data value on data lines 88 that corresponds to a 4-bit slip time value. However, the actual number of bits that are encoded into the slip time can be more or less than four bits.

The data value on data lines 88 is used to set a max count value in slip time counter 86. For example, a data value of five on data lines 88 sets the max count value in slip time counter 85 to five. The slip time counter 86 then counts from zero to the max count value. During the five clock periods when the slip time counter 86 is counting from zero to five, the mux 82 outputs a slip pattern 80 to exclusive-OR gate 36. If the data value on data lines 88 is zero, then slip time counter 86 immediately activates line 90 causing counter 85 to immediately reset to zero causing mux 82 to start outputting another PN-code.

The slip pattern 80 can be any value or pattern that is easily distinguished from the PN-codes. In one example, it has been determined that a square wave signal that alternates between a logic 1 and logic 0 value on each clock cycle is effective in maintaining the high correlation of the PN-codes. However, any pattern, including a Direct Current (DC) constant logic 1 or constant logic 0 value can also be used.

In the example where the data lines 88 have a value of five, the slip pattern 80 is output from mux 82 for five clock periods until the slip time counter 86 reaches the max count value of five. The slip time counter 86 activates the repeat count line 90 when the slip time count reaches the max count value. The counter 85 then starts a new PN-code count period starting from zero and counting back up to sixty three. This causes the mux 82 to sequentially output the chips for a next PN-code in flip-flops 30 to exclusive-OR circuit 36. A next data value output on data line 89 is then exclusively-ORed with this next PN-code output from mux 82. The slip-time counter 86 resets to zero and sets the max count to the next data value on data lines 88.

Thus, a time gap 54 (FIG. 4) is inserted between adjacent PN-codes that corresponds to the data value on data lines 88. In this example, the slip time was for five time units and corresponds to a four bit binary data value of "0101" or a decimal value of 5.

FIG. 7 shows two separate functional blocks 85 and 86 each representing a separate counter. These two counters are shown as separate functional blocks for explanation purposes. The two counting operations performed by blocks 85 and 86 could be performed by separate counting circuits, the same counter circuit or same state machine, or by the same software programmable general purpose processor. At least some of the encoding circuitry shown in FIG. 7 is synchronously clocked. However for simplicity, the clocking circuitry and clock lines to the individual circuit components have not been shown.

Figure 8:
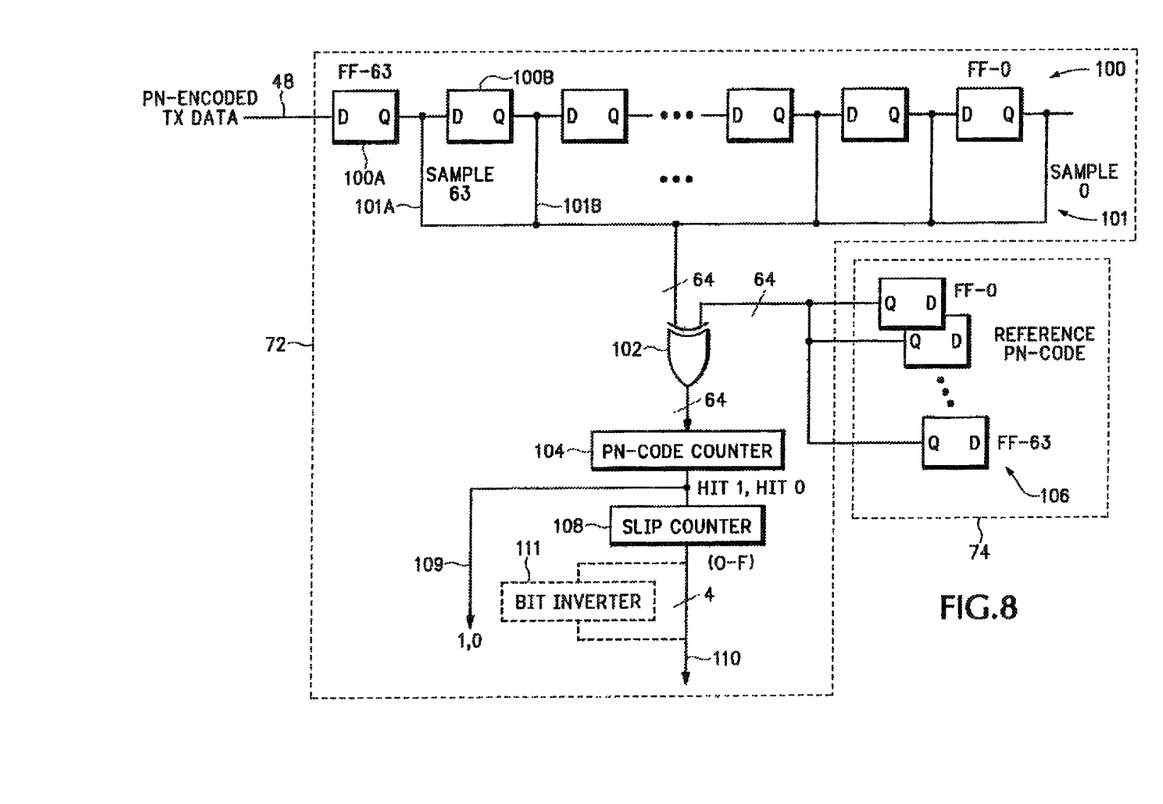
FIG. 8 is a circuit diagram for an SSST correlator.

FIG. 8 shows one example of the Spread Spectrum Slip Time (SSST) correlator 72 and the reference PN-code storage unit 74 previously referred to in FIG. 6. Again as mentioned above, one example is given in FIG. 8 for a spread spectrum correlator that decodes a single 64 chip PN-code with additional slip time encoding. However, similar circuitry would be applicable for a spectrum decoding scheme that uses multiple PN-codes, or that uses a different number of chips in the PN-code, or that decodes slip times that represent more or less than four bit data values.

A set of flip-flops 100 in the correlator 72 sequentially latch data from the received encoded data stream 48. For example, during a first clock period, the flip-flop 100A latches a first sample of the received data stream 48. On a next clock period, flip-flop 100B latches the data previously latched by flip-flop 100A and flip-flop 100A latches a second sample of the data stream 48. The output of each flip-flop 100 corresponds to a sample 101 of the encoded data stream 48. Each sample 101 is exclusively-ORed by exclusive-OR circuit 102 with one of the chips contained in flip-flops 106.

For simplicity only 64 flip-flops 100 are shown in FIG. 8. However, in actual implementation, the received data stream 48 may be over-sampled by several factors of the transmitted bit rate. In this oversampling, one additional set of 64 flip-flops is provided for each additional factor of oversampling. The flip-flops 100 would then be clocked using an oversampling rate. For example, if the encoded data stream 48 is over-sampled by a factor of two, then there would be 128 flip-flops 100 each clocked at twice the clock rate that the data is output from the encoder circuitry shown in FIG. 7. Every other flip flop would then include a sample line 100 that is then coupled to the exclusive-OR circuit 102.

As described above in FIG. 3, the PN-code counter 104 counts the number of logic 0's and 1's from the 64-bit output of exclusive-OR circuit 102. If the number of 1's counted by counter 104 reaches the upper threshold 20 shown in FIG. 2, a data value of 1 is output from counter 104 on data line 109. If the number of 0's counted by counter 104 reaches the lower threshold 22 shown in FIG. 2, a data value of 0 is output from data line 109. The counter 104 then resets to zero and starts sampling the PN-encoded data stream 48 again for the next PN-code.

A value of 0 or 1 output by counter 104 on line 109 indicates correlation with one of the PN-codes. Correspondingly, the slip counter 108 is reset every time a 1 or 0 signal is activated on line 109. The slip counter 108 increases a count value each clock period until another 1 or 0 value is output on line 109. The number of counts generated by slip counter 108 between two detected adjacent PN-codes is output on data lines 110 and corresponds to a second data value in the encoded data stream 48 following the data value output from data line 109. For example, a count value of 69 output from the slip counter 108 from data lines 110 corresponds to a slip time of 69−64=5. In this example, no slip between two PN-codes corresponds to 64 time units, or the length of one PN-code. Therefore, the value 64 is subtracted from the value generated by slip counter 108 to derive the actual number of slip units between the two adjacent PN-codes. Thus, the data value 5 is output as the decoded data value in data stream 48 encoded into the slip time between the two detected PN-codes.

In a similar manner as described above in FIG. 7, the counters 104 and 108 are shown as separate functional blocks for explanation purposes. The two counting operations performed by blocks 104 and 108 can be performed in separate counting circuits, or in the same counter circuit or same state machine. Alternatively, both counting operations can be performed by a same software programmable general purpose processor. Some of the circuitry shown in FIG. 8 is synchronously clocked. However for simplicity, the clocking circuitry and clock lines to the individual circuit components are not shown. The oversample clock operating flip-flops 100 could be some magnitude faster than another clock used to operate the other circuitry in FIG. 8.

Referring back to FIG. 7, a bit, comparator, and inverter 93 shown in FIG. 7 can be used to further increase the bit rate of the SSST encoding scheme. Referring back to FIG. 4, the amount of slip time 54 between two adjacent PN-codes increases with larger associated data values. For example, a four bit data value of 1 has a corresponding slip time of 1 slip unit 56. However, a four bit data value of fifteen has a corresponding slip time of 15 slip units. Thus, larger data values decrease the bandwidth of the transmitted data stream 48.

The bit comparator 93 in FIG. 7 inverts bits for large data values to increase bandwidth. For example, in FIG. 9 a first four bit data value of 12 ('1100' binary) is received for encoding as a slip time. A data value of 12 normally uses 12 slip time units between PN-codes 142 and 144. The bit comparator and inverter 93 (FIG. 7) detects any four bit data value above some threshold, such as say the value eight. The bits for any data values received on data lines 88 greater than the threshold value are inverted. Thus, the four bits for the data value of 12 are inverted to generate the value 3. The slip time 148 is then generated using the inverted data value. Instead of the slip time 148 being 12 slip units long, the slip time 148 is only 3 time units long.

Figure 9:
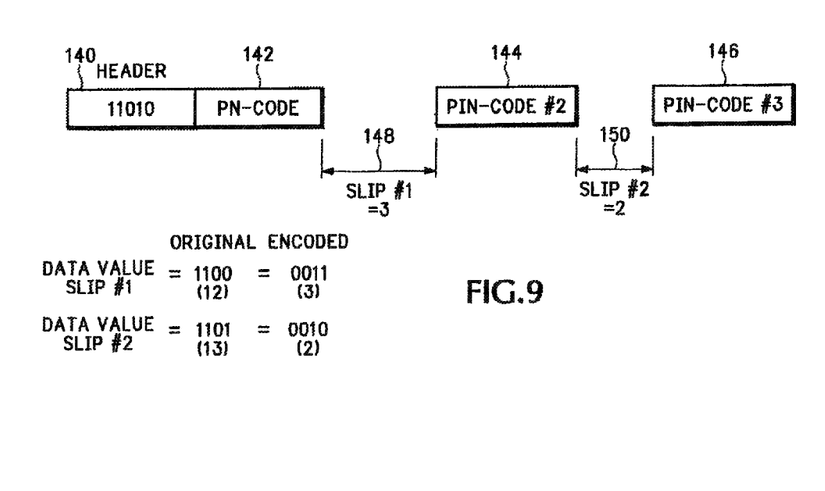
FIG. 9 is a diagram that shows how the bandwidth of the SSST encoding scheme can be further increased.

In another example, a four bit data value of 13 is provided for encoding between PN-codes 144 and 146. The bit inverter 93 (FIG. 7) inverts the bits '1101' representing the data value 13 into the inverted data value of 2 ('0010' binary). Thus, eleven fewer slip increments are used for encoding the data value 13. A bit in header 140 is then set by inverter 93 to identify the slip times with inverted data values. A bit inverter 111 in the correlator 72 in FIG. 8 reads the header 140 and inverts the bits output from slip counter 108 that have associated bits set in header 140.

Figure 10:
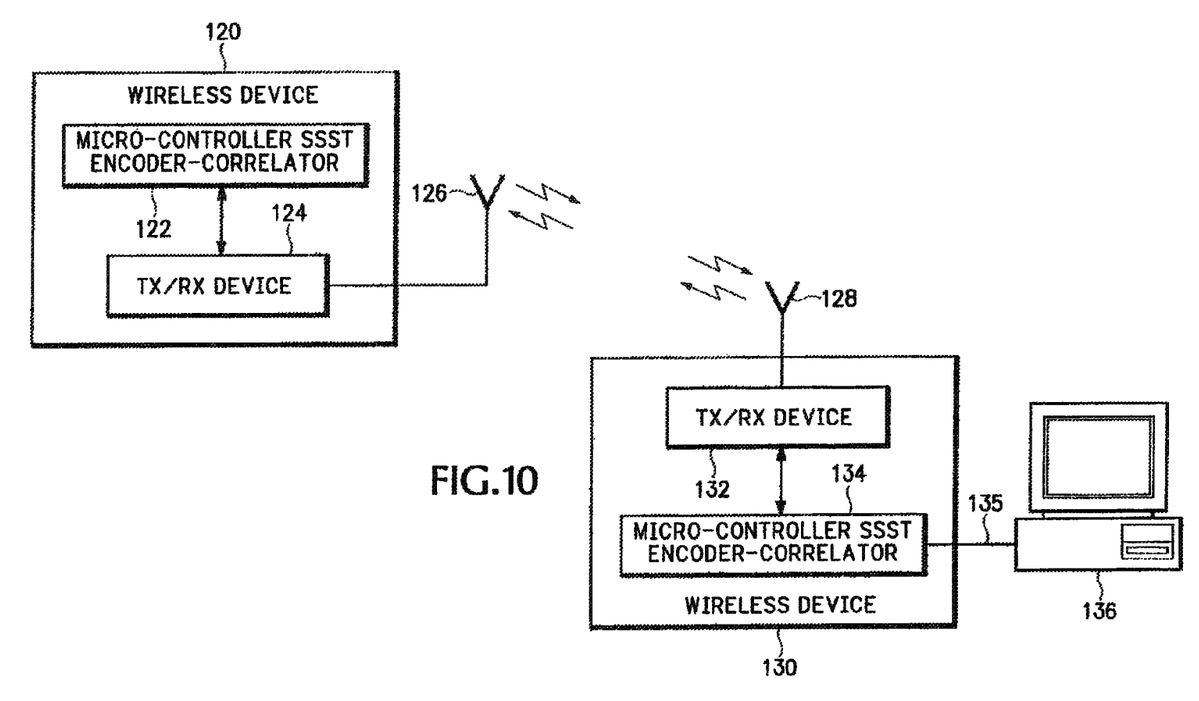
FIG. 10 is a block diagram that shows the SSST encoding scheme used in a wireless device.

FIG. 10 shows a wireless device 120 that includes a conventional transmitter/receiver device 124 and antenna 126 for transmitting and receiving wireless signals. A micro-controller 122 in the wireless device 120 includes the software for conducting the Spread Spectrum Slip Time (SSST) encoding and correlation scheme described above according to the invention. Another wireless device 130 also includes a conventional transmitter/receiver device 132 and antenna 128 for transmitting and receiving wireless signals with wireless device 120. A micro-controller 134 in the wireless device 130 also includes the software for conducting the SSST encoding and correlation scheme described above according to the invention.

The wireless devices 120 and 130 can be any devices that are used for transmitting and receiving wireless spread spectrum signals. In one example, the wireless device 120 is a wireless mouse and the wireless device 130 is a dongle used for receiving the signals from the mouse. The dongle 130 is coupled to a Universal Serial Bus (USB) port 135 in a computer 136. The signals received by the wireless dongle 130 are used for controlling operations in the computer 136.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

We claim:

1. A receiver, comprising:
a first decoder configured to decode data from an at least partially spread spectrum encoded data stream; and
a second decoder configured to decode additional data corresponding to a predetermined period of time delay detected between adjacent spread spectrum codes in the at least partially spread spectrum encoded data stream, wherein no spread spectrum codes are received during the predetermined period of time delay, and wherein a length of the predetermined period of time delay between an end of a first spread spectrum code and a start of a second spread spectrum code is representative of a data value for the additional data, where the additional data comprises at least part of a non-spread spectrum encoded portion of the data stream.

2. The receiver of claim 1, wherein different durations are used for the predetermined period of time delay between different pairs of adjacent spread spectrum codes and the different durations correspond to different data values for the additional data.

3. The receiver of claim 1, further comprising:
a storage device to store one or more reference spread spectrum codes; and
a sampling circuit to take a sample of the at least partially spread spectrum encoded data stream and to compare the sample with the one or more reference spread spectrum codes.

4. The receiver of claim 3, further comprising:
a first counter to count a number of chips for the one or more reference spread spectrum codes that match and mismatch the sample taken by the sampling circuit, the first counter further to identify data values for the spread spectrum codes according to the number of chips that match and mismatch.

5. The receiver of claim 4, further comprising:
a second counter to detect the predetermined period of time delay between the data values identified by the match counter.

6. The receiver of claim 5, wherein the second counter subtracts a transmit time value associated with transmitting the spread spectrum codes from the detected predetermined period of time delay.

7. The receiver of claim 1, wherein the predetermine period of time delay comprises a predetermined number of clock periods.

8. A method comprising:
decoding a first set of data values from an at least partially spread spectrum encoded data stream, the first set of data values encoded in a plurality of spread spectrum codes in the at least partially spread spectrum encoded data stream;
detecting a predetermined period of time delay between adjacent spread spectrum codes in the at least partially spread spectrum encoded data stream, wherein no spread spectrum codes are received during the predetermined period of time delay; and
decoding a second set of data values corresponding to the predetermined period of time delay, wherein a length of the predetermined period of time delay between an end of a first spread spectrum code and a start of a second spread spectrum code is representative of a data value for the additional data, where the additional data comprises at least part of a non-spread spectrum encoded portion of the data stream.

9. The method of claim 8, wherein different durations are used for the predetermined period of time delay between different pairs of adjacent spread spectrum codes and the different durations correspond to different data values for the additional data.

10. The method of claim 8, further comprising:
storing one or more reference spread spectrum codes;
taking a sample of the at least partially spread spectrum encoded data stream; and
comparing the sample with the one or more stored reference spread spectrum codes.

11. The method of claim 10, further comprising:
counting a number of chips for the one or more reference spread spectrum codes that match and mismatch the sample; and
identifying data values for the spread spectrum codes according to the number of chips that match and mismatch.

12. The method of claim 11, further comprising:
subtracting a transmit time value associated with transmitting the spread spectrum codes from the detected predetermined period of time delay.

13. A system comprising:
a first encoder configured to encode data values with one or more spread spectrum codes and generate a corresponding at least partially spread spectrum encoded data stream;
a second encoder configured to encode additional data into the at least partially spread spectrum encoded data stream by inserting a predetermined period of time delay between adjacent spread spectrum codes in the at least partially spread spectrum encoded data stream, wherein no spread spectrum codes are transmitted during the predetermined period of time delay, and wherein a length of the predetermined period of time delay between an end of a first spread spectrum code and a start of a second spread spectrum code is representative of a data value for the additional data, where the additional data comprises at least part of a non-spread spectrum encoded portion of the data stream;
a first decoder configured to decode the data values in the one or more spread spectrum codes from the at least partially spread spectrum encoded data stream; and
a second decoder configured to decode the additional data corresponding to the predetermined period of time delay detected between adjacent spread spectrum codes in the at least partially spread spectrum encoded data stream.

14. The system of claim 13, wherein different durations are used for the predetermined period of time delay between different pairs of adjacent spread spectrum codes and the different durations correspond to different data values for the additional data.

15. The system of claim 13, further comprising:
a storage device to store the one or more spread spectrum codes; and
a shifter for serially encoding some of the data values with the one or more spread spectrum codes.

16. The system of claim 13, further comprising:
a storage device to store one or more reference spread spectrum codes; and
a sampling circuit to take a sample of the at least partially spread spectrum encoded data stream and compare the sample with the one or more reference spread spectrum codes.

17. The system of claim 16, further comprising:
a first counter to count a number of chips for the one or more reference spread spectrum codes that match and mismatch the sample taken by the sampling circuit, the first counter further to identify data values for the spread spectrum codes according to the number of chips that match and mismatch.

18. The system of claim 17, further comprising:
a second counter to detect the predetermined period of time delay between the data values identified by the first counter.

19. The system of claim 18, wherein the second counter subtracts a transmit time value associated with transmitting the spread spectrum codes from the detected predetermined period of time delay.

20. The system of claim 18, wherein the second counter delays the first counter from outputting the-chips for adjacent spread spectrum codes according to associated data values.

* * * * *